United States Patent [19]
Spiteri

[11] 4,348,342
[45] Sep. 7, 1982

[54] METHOD FOR MAKING ELECTRODYNAMIC LOUDSPEAKERS HAVING A PLANAR DIAPHRAGM OF EXPANDED POLYSTYRENE

[76] Inventor: Ernest Spiteri, 29 Ave. Monge, 77490 Chelles, France

[21] Appl. No.: 234,020

[22] Filed: Feb. 12, 1981

[30] Foreign Application Priority Data

Mar. 7, 1980 [FR] France ................................ 80 05143

[51] Int. Cl.$^3$ ........................ B29C 17/12; B29D 27/00
[52] U.S. Cl. ........................................ 264/28; 264/53; 264/157; 264/162
[58] Field of Search ................. 264/28, 139, 157, 158, 264/162, 321, 51, 53

[56] References Cited

U.S. PATENT DOCUMENTS

| | | | |
|---|---|---|---|
| 2,604,663 | 7/1952 | Talalay | 264/28 |
| 3,832,106 | 8/1974 | Lahousse | 264/51 |
| 3,863,908 | 2/1975 | Charpentier | 264/51 |
| 3,889,032 | 6/1975 | Koelsch | 264/51 |

FOREIGN PATENT DOCUMENTS

| | | | |
|---|---|---|---|
| 1269138 | 7/1961 | France . | |
| 87555 | 9/1966 | France . | |
| 7107225 | 10/1972 | France . | |
| 884322 | 12/1961 | United Kingdom | 264/28 |

*Primary Examiner*—Willard E. Hoag
*Attorney, Agent, or Firm*—Martin P. Hoffman; Mitchell B. Wasson

[57] ABSTRACT

The process comprises injecting, before the polystyrene expanding stage, high-pressure steam into a mould which forms the definitive shape of the ribbed and grooved surface of a blank of the diaphragm. After removal of the blank from the mould, water is made to travel toward the ribbed and grooved surface of the blank by condensation resulting from a lowering of the temperature. The blank is then brutally frozen so as to produce microfractures in a thin superficial zone of the blank. This superficial zone is removed by means of a suitable machining operation so as to expose under this zone the softened aspect of the diaphragm immediately subjacent to this zone.

Application in the manufacture of electrodynamic loudspeakers.

5 Claims, 1 Drawing Figure

METHOD FOR MAKING ELECTRODYNAMIC LOUDSPEAKERS HAVING A PLANAR DIAPHRAGM OF EXPANDED POLYSTYRENE

Related applications include applications Ser. Nos. 234,018 and 234,019, filed concurrently herewith on Feb. 12, 1981 in the name of Ernest Spiteri, the applicant herein.

French Pat. No. 1 269 138 filed on 23 June 1960 by Georges POUTOT, its first addition No. 87 555 filed on 17 March 1965 by Mr. Georges Poutot, its first patent of addition No. 87 555, filed on Mar. 17, 1965 by Georges Gogny and French patent application No. 71 07225 filed on Mar. 3, 1971 by Michel Touze, now French Pat. 2,128,065 published Oct. 20, 1972, discloses electrodynamic loudspeakers comprising a transducer (oscillating electric energy) and a coupler (vibratory mechanical energy), the transducer performing the function of a driver and the coupler the element which puts the layers of surrounding air in vibration.

The transducer comprises a plurality of permanent magnets of equal or unequal lengths which are disposed in parallel layers defining parallel passageways in which the magnetic field circulates.

The coupler (or light oscillating diaphragm) is made from a low-density material, advantageously expanded polystyrene.

The inner side of the diaphragm facing the transducer is arranged in the form of grooves and ribs which are longitudinally inserted in at least a part of the parallel passageways of the transducer. Adhered to the ribs is the conductive band receiving the electric current corresponding to the sound to be transmitted, said band extending in a tortuous zig-zag line defined in said patents by the term "greek".

It has been attempted in said patents to ensure that the couplers have fidelity without distortion, to ensure that they move while remaining exactly parallel to themselves, to improve the response curves at all frequencies and in particular at low frequencies, and to eliminate all harmful frequencies.

However, it must be said that, in practice, this object has not been attained.

In a particular aspect of the problem to be solved according to the present invention, it must be admitted that a satisfactory solution has not been provided from the point of view of the surface condition of the diaphragm in the region of the air-diaphragm coupling.

An object of the present invention is consequently to improve the acoustic qualities of said electrodynamic speakers by improving the surface condition of the diaphragms of expanded polystyrene.

In the prior art, the loudspeakers having planar expanded polystyrene diaphragms driven by a transducer having a band folded in the "greek" form throughout the rear surface of the coupler, comprise a network of magnetic members formed by a series of magnets aligned in the same direction and in confronting relation to the conductive "greek" structure adhered to the diaphragm.

The theoretical advantage of this system is that the diaphragm moves while remaining parallel to itself and the signals emitted are in phase with the diaphragm which is acted upon equally at all points of its area. This "piston action" occurs in a wide range of the audio frequency band owing to the low density of the expanded polystyrene.

The "piston action" of the unit is unfortunately not reproduced in practice. As the diaphragm is cut from the mass of the material employed, the equilibrium of the internal tensions of the material is upset and the lack of homogeneity in the thickness results in zones of unequal rigidity and density. This defect, in combination with lack of uniformity of the magnetic field of the transducer, results in a deformation of the conductive band. As this deformation of the band is not reduced by the deficient rigidity of the diaphragm, there are local deformations of the surface of the diaphragm which result in a distortion of the sound emitted and a local difference in phase. The lack of rigidity of the diaphragm, its dimensional instability and the hardness of its surface consequently produced a hard metallic sound and therefore a "colouration".

As the colouration of the sounds produced by the couplers is due to the nature of the material employed for making them (specific weight, Young's modulus) and above all the nature of their surface in contact with the air to be displaced (air/diaphragm coupling), the surface condition requires to be softened by a treatment which acts only on the skin (coupling zone) preferably without addition of foreign materials which may modify the nature, density or solidity of the product forming the coupler (diaphragm).

The process according to the invention comprises employing the residual amount of steam which remains just after the expansion of the polystyrene and is trapped to a certain percentage in the blank of the diaphragm which is moulded in its definitive shape with its ribs, causing the water, after removing the blank from the mould, to move toward the ribbed and grooved surface of the blank of the diaphragm by condensation achieved by lowering the temperature, brutally freezing the blank of the diaphragm so as to produce microfractures in a thin superficial zone of the diaphragm, and withdrawing said superficial zone by a suitable machining operation so as to expose under this zone the softer aspect of the diaphragm immediately subjacent to said zone.

In a particularly advantageous manner of carrying out the invention, the blank of expanded polystyrene has the shape of a block whose two opposed sides define the relief of two identical diaphragms which face in opposite directions and are subsequently cut from the block, the intermediate part, which is intended to be thrown away after the cutting, acting as a water-supply reservoir when the water is injected in the form of steam in the first stage of the process.

Further features and advantages of the invention will be apparent from the ensuing description and claims with reference to the accompanying drawings in which:

FIG. 2 is an identical view showing the obtainment of the two diaphragms after they have been cut from the block and the now useless intermediate part is dispensed with.

Figure 1:
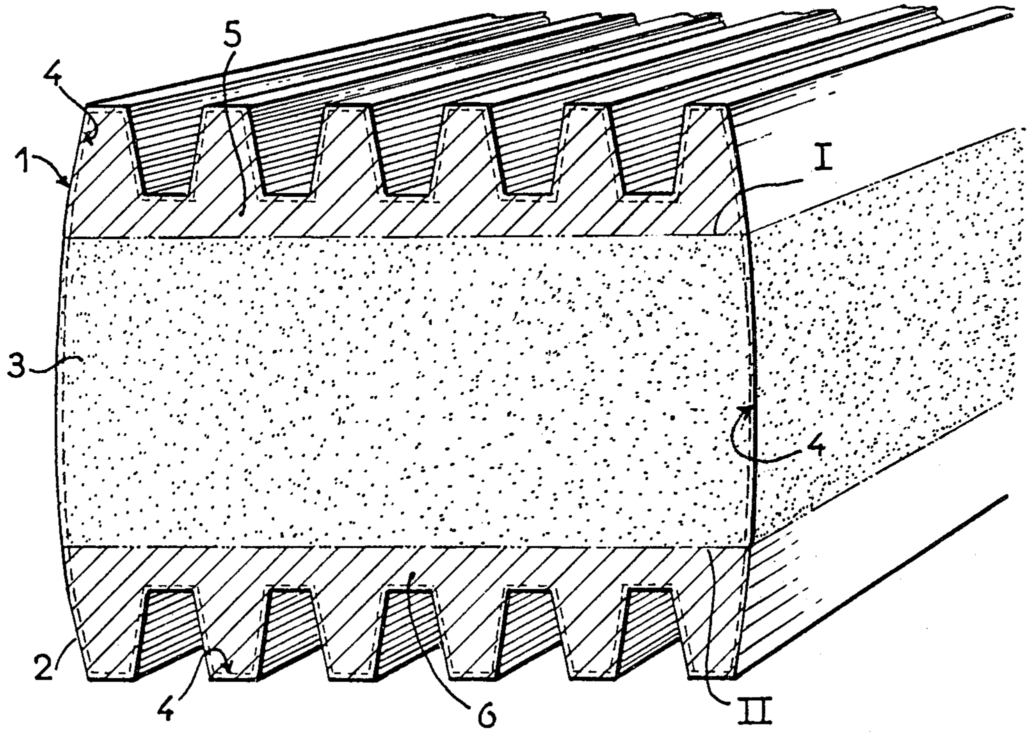
FIG. 1 is a perspective view of a single-piece block in opposed sides of which two diaphragms according to the invention are moulded.
Figure 2:
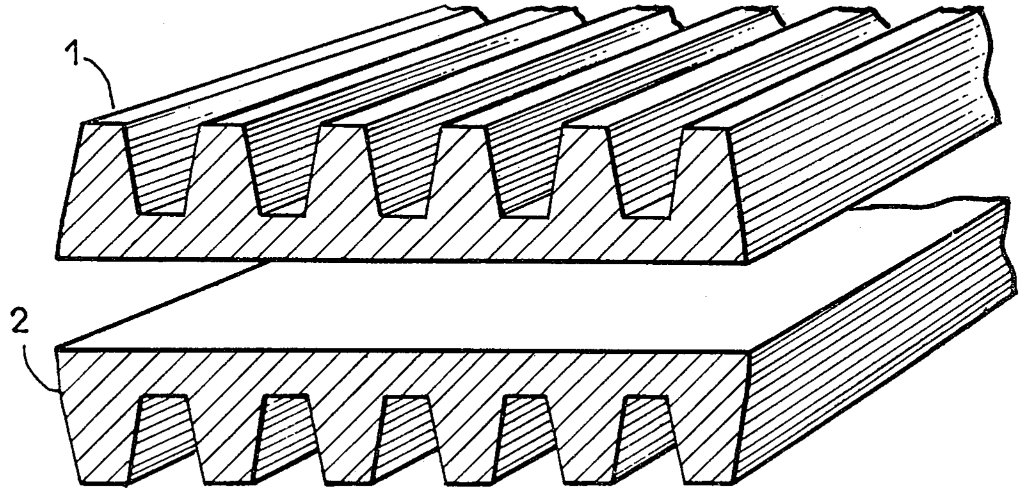

In the embodiment shown in FIG. 1, there is shown a moulded blank comprising a diaphragm 1, and a second diaphragm 2 which are in one piece with an intermediate centre part 3. In FIG. 2, the centre part 3 has been cut away after a grinding of the surface, as will be explained hereinafter; and dispensed with and there remain only the two diaphragms whose special surfaces result from the hygrometric and heat treatments according to the invention.

The process according to the invention comprises moulding a single piece blank of expanded polystyrene. The known technique for expanding this material is combined with a simultaneous injection into the polystyrene of high-pressure steam in a mould having a configuration which is close to the desired size. As the material conforms to the shape of the mould, the orientation of the lines of force forming the final structure of the diaphragm will be respected. This will ensure, for a given density, a greater rigidity after bringing the block to the definitive size and an improved dimensional stability, this final machining removing very little material.

The following procedure is adopted for effecting a surface treatment.

When the blank which was injected with steam is removed from the mould, a percentage of the water of the steam remains trapped in the material. The surface treating process resides in causing this water to migrate, in a first stage, toward the surface of the part under a relatively fluidtight skin which is produced by the effect of the polished surface of the mould. This migration is achieved by condensation resulting from a lowering of the temperature to 5° or 6° C. for a period of several hours. This skin 4 has a thickness of a few tenths of a millimeter.

The intermediate part 3 acts as a water supply reservoir and its thickness is determined beforehand and permits controlling the process of the second stage.

The second stage of the process comprises brutally freezing the blank to −18° C. to −20° C. for several hours. This water is concentrated and trapped just under the skin of the blank, which is rendered relatively fluidtight by the polishing of the mould. The crystallization and the increase in volume of this water, associated with the drop in temperature and the fragility of the material which is rendered brittle at this temperature, results in microfractures of the fibres forming the material solely on the outer periphery in a small zone 5 or 6 located under the skin 4 of this surface at a depth of a few millimeters from the bottom of the grooves. After drying, the third stage of the process comprises removing this skin 4 by grinding when bringing the blank to the definitive size while respecting the softened condition subjacent to this skin. The surfaces of the cuts in planes I and II have an aspect determined by the volume of water trapped in the intermediate part 3. This volume of lost material is determined beforehand by trials. The amount of water supplied for controlling the desired thickness of the zone to be treated is determined by the thickness of the intermediate part 3.

To summarize, the polystyrene is expanded except in contact with the mould and it becomes welded and forms a fluidtight film on the surface. After grinding, a cottony or downy and mat surface is obtained, the texture of the polystyrene being broken in the region of contact between the diaphragm and the air. In the case of a diaphragm which had not been treated by the process according to the invention, a hard and bright surface would be obtained which is extremely harmful to the transmission of sound.

It is important to note that the surface aspect of the skin 4 is a crust which has bad acoustic qualities. This is why it must be removed. But just below, after the removal of this crust by grinding, there is found an acoustically perfect surface, as was ascertained by trials.

Further, note that the combined hygrometric and heat treatments according to the invention, transform the structure of the initial blank up to a certain distance from the bottom of the grooves of the diaphragm, so that the cutting of the diaphragm before use separates the centre part 3 whose structure has bad acoustic qualities, from the two parts 1 and 2 (diaphragm) whose internal structure is modified and has considerably improved acoustic qualities up to and including the cutting zone in planes I and II. The crenelated outer part of the diaphragms of course only acquires these exceptional qualities after the removal of the surface skin 4.

In practice, the blank is dried in the form of a single piece and it is even of interest, if the procedure is not carried out with artificial means, to store the blanks for drying for several weeks, if not several months. It is only then, namely just before the diaphragms are to be used, that they are ground in a single-piece form (rigidity of the whole which thus offers an improved resistance to the mechanical skin removing process) and cut along the planes I and II.

The improved definitive surface according to the invention is then identical both on the surface of the grooves and ribs and on the surface of the cutting plane. Thus two diaphragms are obtained which have perfect and identical acoustic qualities throughout their surface.

It must be understood that any modification in the embodiments just described may be made without departing from the scope of the invention as defined in the claims.

Having now described my invention, what I claim as new and desire to secure by Letters Patent is:

1. A process for producing a diaphragm of expanded polystyrene for an electrodynamic speaker, comprising moulding a blank of expanded polystyrene with the use of steam in a mould to produce the blank in its definitive state with a ribbed and grooved surface on the blank, removing the blank from the mould, making use of a residual amount of said steam which remains just after the expansion of the polystyrene and is trapped to a certain percentage in the blank by lowering the temperature of the blank and condensing said steam and causing the water of said steam to travel toward said ribbed and grooved surface of the blank, brutally freezing the blank so as to produce microfractures in a thin superficial zone of the blank, and removing said superficial zone by a suitable machining operation so as to expose under said superficial zone a softer aspect of the diaphragm immediately subjacent to said superficial zone.

2. A process according to claim 1, wherein said blank is in the form of a block having two of said ribbed and grooved surfaces respectively on two opposite sides of the block, said ribbed and grooved surfaces corresponding to ribbed and grooved surfaces of two identical diaphragms which face in opposite directions and occupy two outer parts of the block, an intermediate part of the block between said two parts acting as a water supply reservoir when the water is injected in the form of said steam for moulding the block, the process comprising detaching the two diaphragms by cutting said two outer parts from the block and discarding said intermediate part of the block.

3. A process according to claim 2, wherein the treatments of the block with steam and heat transform the structure of the block up to a certain distance from the bottom of said grooves corresponding to a cutting plane of the cut which is made for cutting said outer parts from the block and detaching said outer parts from said intermediate part whose structure will remain substantially without modification.

4. A process according to claim 3, comprising drying the block while the block is still whole and includes said two outer parts and said intermediate part, and removing the superficial skin of the block by grinding the block while the block is still whole so that said intermediate part participates in the rigidity of the block during the grinding, said two outer parts of the block being cut from the block only after the grinding.

5. A process according to claim 3, carried out under such treating conditions that it is possible to obtain after the cutting of said two outer parts corresponding to the two diaphragms an acoustically perfect but identical surface on the ribbed and grooved surface of each diaphragm and on the surface of the diaphragm in said cutting plane.

* * * * *